(12) United States Patent
Schmidt et al.

(10) Patent No.: US 10,566,596 B2
(45) Date of Patent: Feb. 18, 2020

(54) BATTERY UNIT AND WIRING UNIT FOR A BATTERY UNIT

(71) Applicant: VOLKSWAGEN AKTIENGESELLSCHAFT, Wolfsburg (DE)

(72) Inventors: Stephan Schmidt, Falkensee (DE); Matthias Berg, Wolfsburg (DE); Holger Opfer, Lehre (DE)

(73) Assignee: Volkswagen AG, Wolfsburg (DE)

( * ) Notice: Subject to any disclaimer, the term of this patent is extended or adjusted under 35 U.S.C. 154(b) by 44 days.

(21) Appl. No.: 15/692,417

(22) Filed: Aug. 31, 2017

(65) Prior Publication Data
US 2018/0069223 A1 Mar. 8, 2018

(30) Foreign Application Priority Data
Sep. 2, 2016 (DE) .................. 10 2016 216 660

(51) Int. Cl.
*H01M 2/20* (2006.01)
*H01M 2/10* (2006.01)
*H01M 10/42* (2006.01)
*H01M 10/48* (2006.01)

(52) U.S. Cl.
CPC .......... *H01M 2/202* (2013.01); *H01M 2/1077* (2013.01); *H01M 10/425* (2013.01); *H01M 10/482* (2013.01); *H01M 2010/4271* (2013.01); *H01M 2010/4278* (2013.01)

(58) Field of Classification Search
None
See application file for complete search history.

(56) References Cited

U.S. PATENT DOCUMENTS

| | | | |
|---|---|---|---|
| 5,414,211 A * | 5/1995 | Chan | H01B 7/2806 156/51 |
| 7,883,993 B2 | 2/2011 | Fuergut et al. | |
| 2008/0093890 A1 | 4/2008 | Mehling et al. | |
| 2012/0161677 A1* | 6/2012 | Kunimitsu | H01M 2/1077 318/139 |
| 2013/0187645 A1* | 7/2013 | Pannetier-Lecoeur | G01R 15/205 324/252 |
| 2017/0133724 A1* | 5/2017 | Schuetz | H01M 2/1077 |

FOREIGN PATENT DOCUMENTS

| | | |
|---|---|---|
| DE | 19706790 A1 | 8/1998 |
| DE | 10318728 A1 | 11/2004 |
| DE | 10352946 A1 | 6/2005 |
| DE | 102004056866 A1 | 1/2006 |
| DE | 102005003132 A1 | 3/2006 |

(Continued)

*Primary Examiner* — Jeremiah R Smith
(74) *Attorney, Agent, or Firm* — Laurence A. Greenberg; Werner H. Stemer; Ralph E. Locher

(57) ABSTRACT

A battery unit includes multiple cell modules which are interconnected. The cell modules respectively include multiple battery cells. Local cell module control units are associated with the cell modules. The cell module control units are configured in such a way that they control and/or monitor the cell modules. The cell module control units are applied to at least one flat conductor sheet. The flat conductor sheet has plugs which are plugged into mating plugs of the cell modules. There is also described a wiring unit for a battery unit.

10 Claims, 2 Drawing Sheets

(56) References Cited

FOREIGN PATENT DOCUMENTS

| DE | 202005019835 U1 | 4/2006 |
| DE | 102010046642 A1 | 5/2011 |
| DE | 102010030063 A1 | 12/2011 |
| DE | 102015211862 A1 | 12/2015 |

* cited by examiner

US 10,566,596 B2

BATTERY UNIT AND WIRING UNIT FOR A BATTERY UNIT

CROSS-REFERENCE TO RELATED APPLICATION

This application claims the priority, under 35 U.S.C. § 119, of German patent application DE 10 2016 216 660.3, filed Sep. 2, 2016; the prior application is herewith incorporated by reference in its entirety.

BACKGROUND OF THE INVENTION

Field of the Invention

The present invention relates to a battery unit and a wiring unit for a battery unit.

Due to the fact that the voltage of a single battery cell is very low (for example, between 2 V and 3 V), it is known to combine battery cells in a cell module. In this context, a predetermined number of battery cells (for example, 12 or 24) are interconnected, depending on the requirement. Examples of interconnection concepts include, for example, 1P, 2P, or 3P. In a 1P interconnection, all battery cells are connected in series. In a 2P interconnection, two battery cells are connected in parallel in each case, and the parallel connections are then connected in series. Correspondingly, in a 3P connection, three battery cells are interconnected in parallel in each case. It is furthermore known to interconnect a number of such cell modules (in parallel and/or in series) in order to achieve desired voltages and capacities. It is furthermore known to control and monitor such cell modules. In this case, control relates in particular to cell balancing, by means of which asymmetries in the voltages of individual battery cells are balanced with respect to one another. Monitoring relates, for example, to the measurement of voltages, currents, or temperatures. If the number of cell modules is sufficiently large, it is inexpedient to carry out the control and monitoring by means of only a single central control unit. Therefore, local cell module control units are used if the number of cell modules is appropriately large.

German published patent application DE 10 2010 030 063 A1 discloses an electrical connection arrangement between a control unit, in particular a motor and/or transmission control unit, and conducting paths of a flexible conductor carrier, in particular a multipole flat conductor, wherein the control unit comprises a plurality of interface pads which are formed using thermoplastic conductive plastic. To establish an electrical connection with a respective conductor pad of a conducting path, the interface pads may be fused with said conductor pads.

U.S. Pat. No. 7,883,993 and its counterpart German published patent application DE 103 52 946 A1 disclose a semiconductor component having a semiconductor switch and a rewiring layer, wherein the semiconductor chip is embedded into a housing plastics composition by its rear side and its edge sides. The active upper side of the semiconductor chip is arranged in a coplanar manner with respect to an upper side of the housing plastics composition, forming an overall upper side which carries the rewiring layer. It is further provided that a flat conductor sheet tape is arranged inside the housing plastics composition and extends from the overall upper side of the semiconductor device to the rear side of the semiconductor chip and is electrically connected to the rear side of the semiconductor chip.

SUMMARY OF THE INVENTION

It is an underlying object of the invention to provide a battery unit and a wiring unit which overcome a variety of disadvantages of the heretofore-known devices and methods of this general type and which provide for a battery unit that has a compact structure and also for a suitable wiring unit.

With the foregoing and other objects in view there is provided, in accordance with the invention, a battery unit, comprising:

a plurality of mutually interconnected cell modules, the cell modules each including a plurality of battery cells and the cell modules having mating plugs;

local cell module control units associated with the cell modules and configured for controlling and monitoring the cell modules;

at least one flat conductor sheet carrying the cell module control units, the flat conductor sheet having plugs that are plugged into the mating plugs of the cell modules.

In other words, the battery unit comprises multiple cell modules which are interconnected, wherein the cell modules respectively comprise multiple battery cells. Local cell module control units are associated with the cell modules, wherein the cell module control units are configured in such a way that they control and/or monitor the cell modules. The cell module control units are applied to (mounted on, attached to, connected to) at least one flat conductor sheet, wherein the flat conductor sheet is configured having plugs which are plugged into the mating plug of the cell modules. This allows a highly compact structure having low height, since the cell module control units do not require an extensive housing. Preferably, the cell module control units are soldered to the flat conductor sheet, but may also, for example, be connected by means of electrically conductive glue. Generally, a cell module control unit may be associated with each cell module; however, preferably, a cell module control unit is associated with at least two cell modules. In addition to the electrical connection, the plug connection is also used for the mechanical connection of the flat conductor sheet. In addition, said flat conductor sheet may be mechanically connected by means of clips, for example, to a housing accommodating the cell modules.

In the simplest case, the flat conductor sheet is used only for accommodating the cell module control unit and its electrical connection to the associated cell module(s) by means of the plug(s), wherein the interconnection of the cell module control units takes place via separate, preferably twisted, cables.

In a preferred embodiment, however, all cell module control units are arranged on exactly one flat conductor sheet, via which they are interconnected in terms of signal technology and with respect to the voltage supply. However, intermediate approaches are also possible, in which each flat conductor sheet carries a specific number of cell module control units, wherein these flat conductor sheets are then, for example, connected to cables.

In one embodiment, the number of cell modules which are associated with one cell module control unit depends on the interconnection of the battery cells in the cell modules. In this case, the greater the number of battery cells which are interconnected in parallel, the greater the number of cell modules which may be associated with one module control unit, since control lines are reduced due to the parallel connection. For example, in a 1P interconnection, one cell module control unit is associated with one cell module; in a 2P interconnection, one cell module control unit is associated with two cell modules, and so forth.

In an additional embodiment, the flat conductor sheet comprises at least one bus line which interconnects the cell module control units. Preferably, the bus line is a two-wire bus line, for example, for CAN. Via the bus lines, all cell module control units may then transmit their data to a central battery control unit.

In an additional embodiment, the flat conductor sheet comprises at least one voltage supply line for the cell module control units.

In an additional embodiment, shielding conductors are arranged parallel to the bus line(s) and/or the voltage supply line(s), wherein electrically conductive layers are placed inside an insulating base sheet and an insulating cover sheet of the flat conductor sheet. Said electrically conductive layers then act along with the shielding conductors as a shield in particular for the bus line, in order to prevent electromagnetic interference.

In an additional embodiment, the flat conductor sheet comprises conductors which have constrictions and which are between the cell module control units and the plugs for the cell modules. The constrictions are densely arranged on the plug and are used as short-circuit protection. If the current flowing from a battery module is too large, the conductor blows and thus protects the cell module control unit and other components in the battery system from overvoltage.

The wiring unit for a battery unit comprises a flat conductor sheet, to which the at least one local cell module control unit is applied, wherein the flat conductor sheet is configured having at least one plug. With respect to the additional embodiments, reference will be made to the preceding designs for the battery unit.

Other features which are considered as characteristic for the invention are set forth in the appended claims.

Although the invention is illustrated and described herein as embodied in a battery unit and wiring unit for a battery unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE
INVENTION

Figure 1:
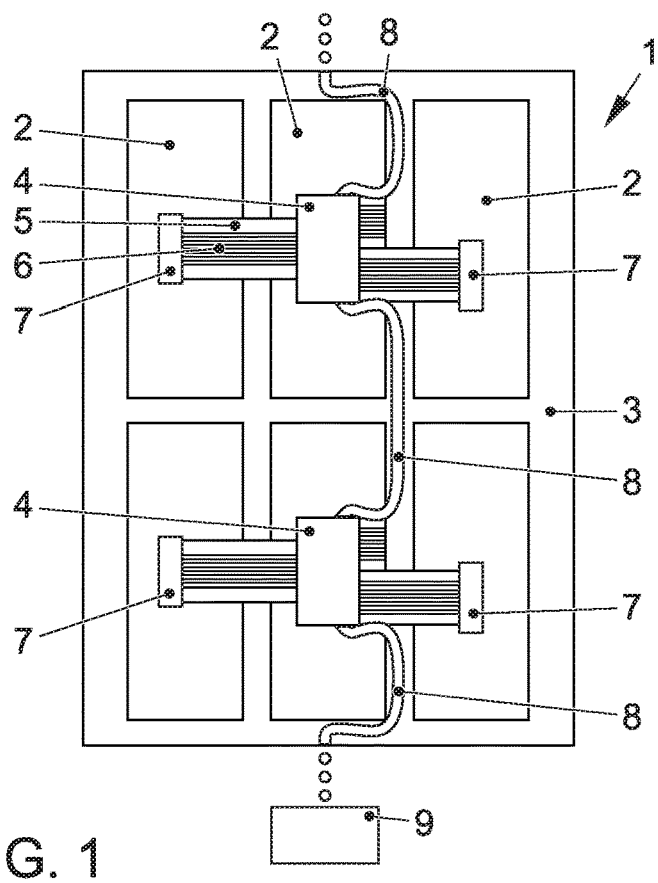
FIG. 1 is a schematic partial depiction of a battery unit according to a first embodiment of the invention.

Referring now to the figures of the drawing in detail and first, particularly, to FIG. 1 thereof, there is shown a partial depiction of a battery unit 1 in a first embodiment. Six cell modules 2 are depicted, which are arranged in a common housing 3. The interconnection of the cell modules is not depicted. One cell module control unit 4 is associated with the upper three cell modules 2, and one cell module control unit 4 is associated with the lower three cell modules 2. The cell module control unit 4 is soldered in each case to a flat conductor sheet 5 which comprises conductors 6. By means of the soldering, the conductors 6 are connected to input and output pins of the cell module control unit 4. A plug 7 is arranged on each of the ends of the conductors 6, said plugs 7 being plugged into mating plugs of the cell modules 2, which mating plugs are not depicted, wherein the plug 7 of the center cell module 2 is covered. Via the conductors 6, measured values such as voltage, current, and temperature may be read out of the cell modules 2, and control commands may be transmitted.

The individual cell module control units 4 are then serially interconnected via twisted cables 8, wherein the last cell module control unit 4 is connected to the central battery control unit 9. The cable 8 contains bus lines and voltage supply lines for the cell module control units 4.

Figure 2:
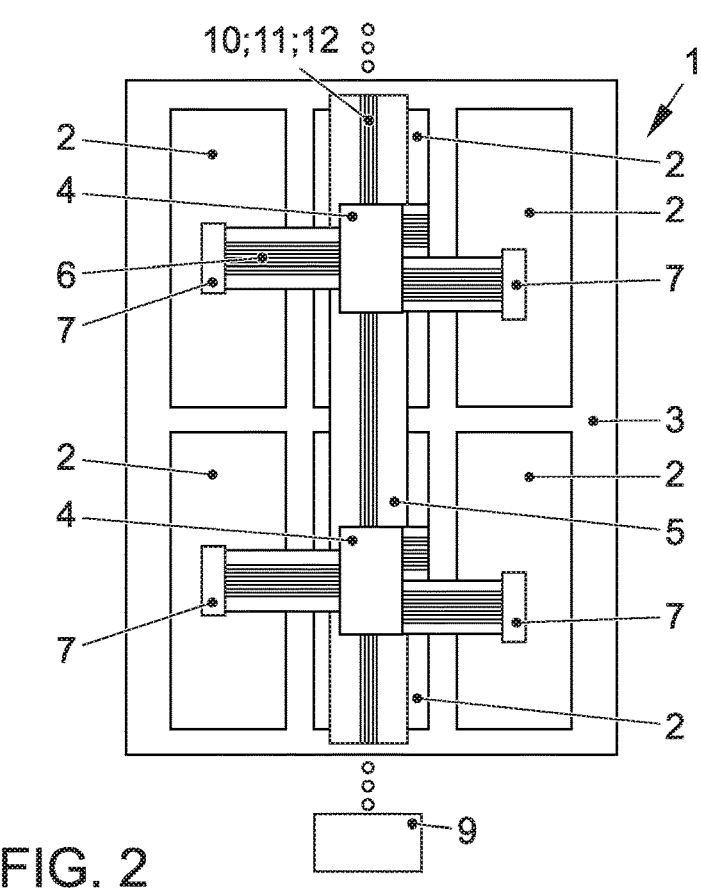
FIG. 2 shows a schematic partial depiction of a battery unit in a second embodiment.
Figure 4:
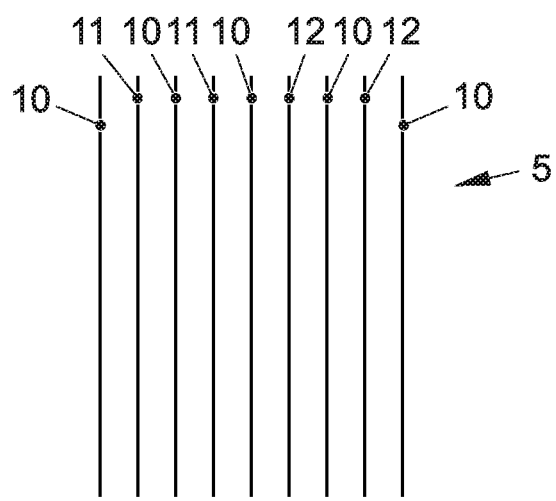
FIG. 4 shows a schematic representation of the conductors between two cell module control units.

FIG. 2 shows an alternative embodiment, in which the functionality of the twisted cables 8 is integrated into the flat conductor sheet 5. For this purpose, in addition to the conductors 6, the flat conductor sheet 5 comprises more shielding conductors 10, bus lines 11, and voltage supply lines 12 for the cell module control units 4, which are to be explained in greater detail based on FIG. 4.

The flat conductor sheet 5 comprises shielding conductors 10, between which bus lines 11 and two voltage supply lines 12 are arranged. The shielding conductors 10 are set to a common reference potential (for example, ground). The shielding conductors 10 are part of a shield, since the bus lines 11 and the voltage supply lines 12 cannot be twisted, as is normally the case, and are thus more sensitive to electromagnetic interference.

Figure 3:
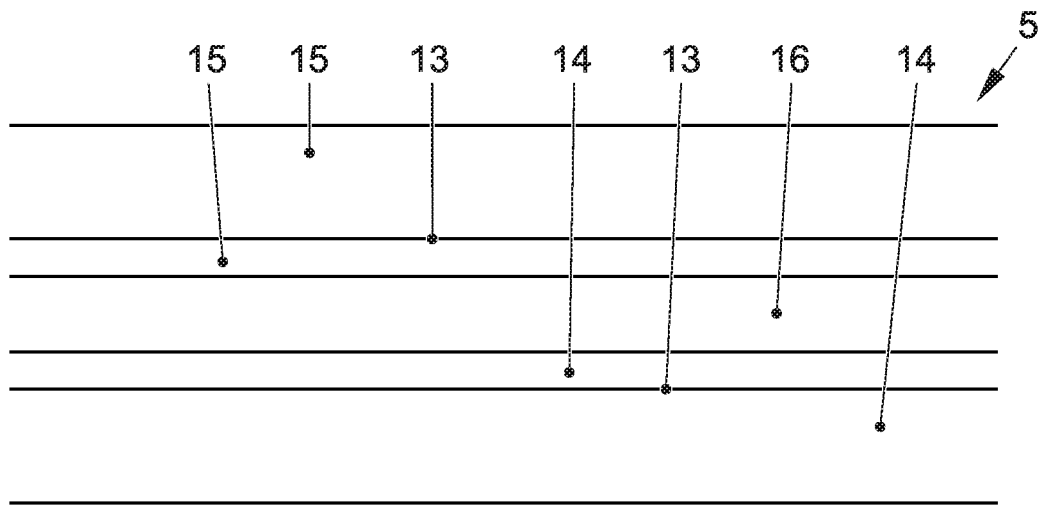
FIG. 3 shows a schematic cross-sectional depiction through a flat conductor sheet.

The shielding which is lacking below and above is implemented via electrically conductive layers 13 in a base sheet 14 and a cover sheet 15 of the flat conductor sheet 5, said electrically conductive layers enveloping the actual metal layer 16 (including the conductors 10-12) of the flat conductor sheet 5 like a sandwich (see also FIG. 3). The conductive layer is, for example, established via a thin, vapor-deposited metal layer. The layers 13 are then set to the same reference potential as the shielding conductors 10.

Figure 5:
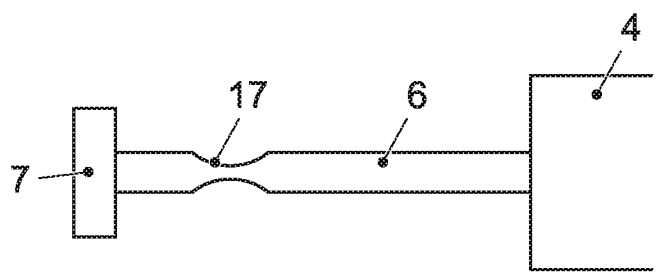
FIG. 5 shows a schematic representation of a constriction.

FIG. 5 depicts a constriction 17 for one of the conductors 6, via which, for example, the voltage of battery cells in the cell modules 2 is measured.

The following is a summary list of reference numerals and the corresponding structure used in the above description of the invention:

1 Battery unit
2 Cell module
3 Housing
4 Cell module control unit
5 Flat conductor sheet
6 Conductors
7 Plug
8 Cable
9 Battery control unit
10 Shielding conductors
11 Bus lines
12 Voltage supply lines
13 Layers
14 Base sheet
15 Cover sheet 16 Metal layer
17 Constriction

The invention claimed is:

1. A battery unit, comprising
a plurality of mutually interconnected cell modules, said cell modules each including a plurality of battery cells and said cell modules having mating plugs;
local cell module control units associated with said cell modules and configured for controlling and monitoring said cell modules; and
at least one flat conductor sheet carrying said cell module control units, said flat conductor sheet having plugs that are plugged into said mating plugs of said cell modules;
said plurality of mutually interconnected cell modules including a first group of electrically connected cell modules and a second group of electrically connected cell modules;
said local cell module control units including a single cell module control unit associated with only said first group of cell modules; and
said local cell module control units including another cell module control unit associated with only said second group of cell modules.

2. The battery unit according to claim 1, wherein said at least one flat conductor sheet is exactly one flat conductor sheet and all of said cell module control units are arranged on said exactly one said flat conductor sheet.

3. The battery unit according to claim 1, wherein one respective said cell module control unit is associated with a plurality of said cell modules.

4. The battery unit according to claim 1, wherein a number of said cell modules that are associated with one cell module control unit becomes greater as a number of cell modules that are connected in parallel becomes greater.

5. The battery unit according to claim 1, wherein said flat conductor sheet comprises at least one bus line interconnecting said cell module control units.

6. The battery unit according to claim 5, wherein said flat conductor sheet further comprises at least one voltage supply line for said cell module control units.

7. The battery unit according to claim 6, which comprises shielding conductors arranged parallel to said at least one bus line and/or said at least one voltage supply line, and wherein electrically conductive layers are placed inside an electrically insulating base sheet and an electrically insulating cover sheet of said flat conductor sheet.

8. The battery unit according to claim 1, wherein said flat conductor sheet comprises at least one voltage supply line for said cell module control units.

9. The battery unit according to claim 8, which comprises shielding conductors arranged parallel to said at least one voltage supply line, and wherein electrically conductive layers are placed inside an electrically insulating base sheet and an electrically insulating cover sheet of said flat conductor sheet.

10. The battery unit according to claim 1, wherein said flat conductor sheet comprises conductors between said cell module control units and said plugs, and wherein said conductors have constrictions.

* * * * *